3 Sheets—Sheet 1.

T. MELLING.
Piston Water-Meter.

No. 204,357. Patented May 28, 1878.

WITNESSES
Donn P. Twitchell.
D. P. Cowl

INVENTOR
Thomas Melling
By Dodgerson attys

3 Sheets—Sheet 2.

T. MELLING.
Piston Water-Meter.

No. 204,357. Patented May 28, 1878.

WITNESSES

INVENTOR
Thomas Melling
By Dodger&... attys

3 Sheets—Sheet 3.

T. MELLING.
Piston Water-Meter.

No. 204,357. Patented May 28, 1878.

WITNESSES
Donn P. Twitchell
D. P. Cowl

INVENTOR.
Thomas Melling
By Dodgerson Attys.

UNITED STATES PATENT OFFICE.

THOMAS MELLING, OF RAINHILL, ENGLAND.

IMPROVEMENT IN PISTON WATER-METERS.

Specification forming part of Letters Patent No. 204,357, dated May 28, 1878; application filed March 30, 1878.

*To all whom it may concern:*

Be it known that I, THOMAS MELLING, of Rainhill, in the county of Lancaster, in the Kingdom of England, civil engineer, have invented new and useful Improvements in Water-Meters, which improvements are fully set forth in the following specification, reference being had to the accompanying drawings.

My invention has for its object the measuring and registering the quantity of water or other fluids flowing through pipes, &c., in an accurate and reliable manner by an instrument simple in construction, inexpensive in maintenance, silent and steady in working, and certain in its action.

Numerous contrivances have been previously introduced for this purpose, and have severally been found either inaccurate in measurement, liable to allow the water to pass unregistered, rough and noisy in working, and consequently objectionable, and subject to great wear and tear, costly in original construction, requiring frequent inspection, or altogether ineffective, all of which objections my invention is designed to obviate. This it does by supplying two important and long-sought desiderata in water-meters—viz., valves which shall at the same time be tight, easily moved, and prevent the passage of unmeasured water while they are being changed in position, and gearing to work such valves which shall combine simplicity of construction with certainty of action.

Fulfilling these conditions, my improved water (or fluid) meter becomes strictly positive, or an absolute and reliable measure.

It consists as follows: First, a measuring-cylinder, with its piston and rod; second, two piston-valves and the side pipe in which they are contained; third, the gearing by which the said valves are worked; and, fourth, the clock-work for registering the quantity of water measured.

For the further elucidation of my said invention I have annexed drawings thereof, in which—

Figure 1:
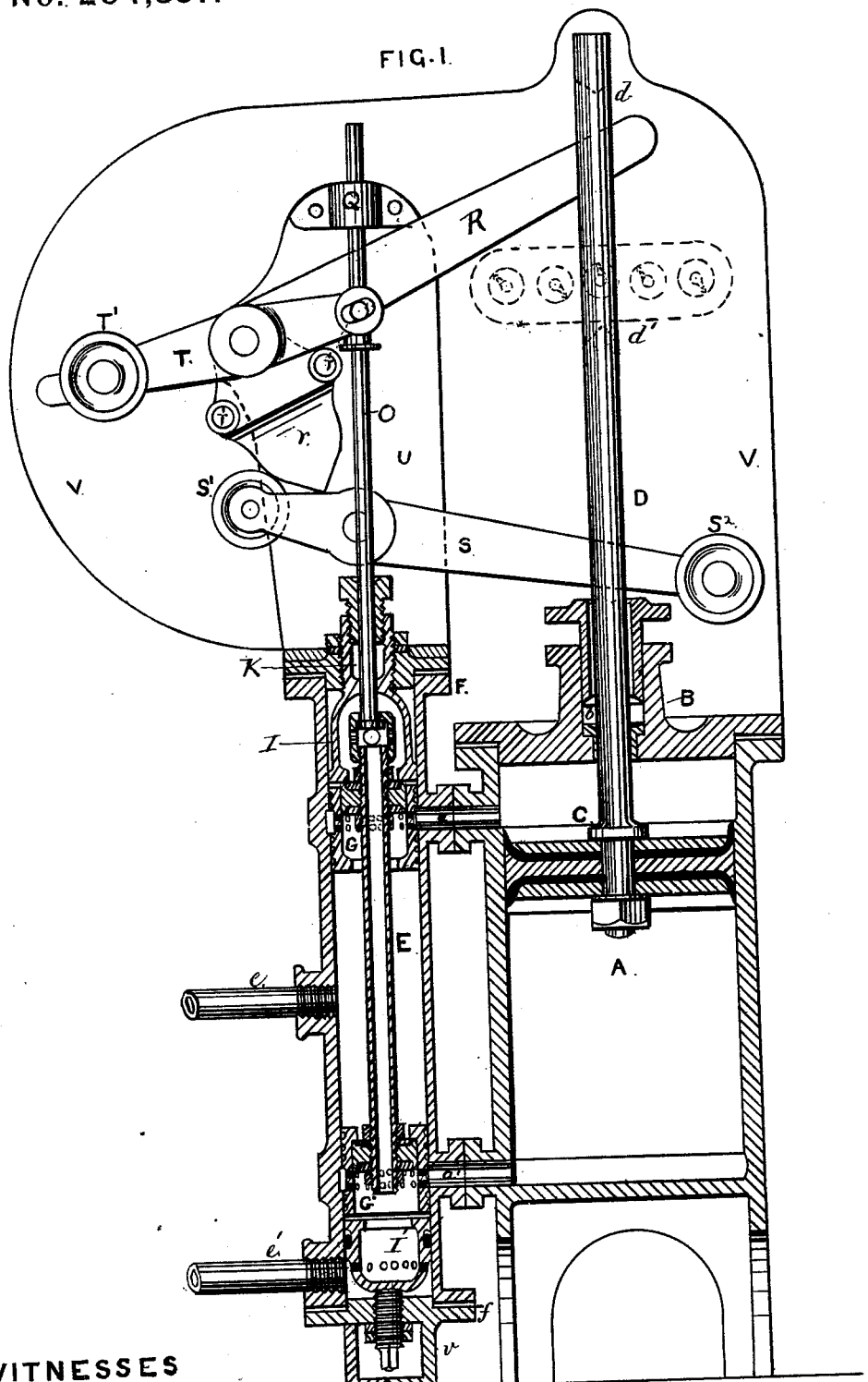
Figure 2:
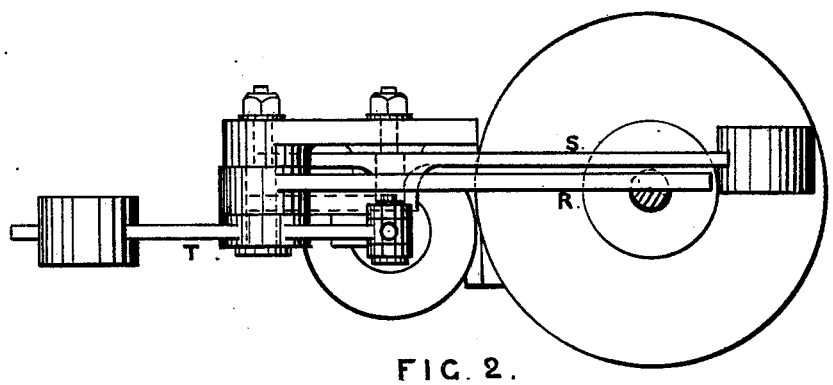
Figure 3:
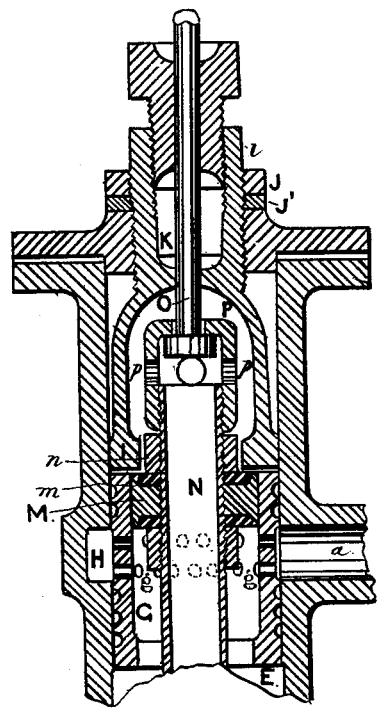
Figure 4:
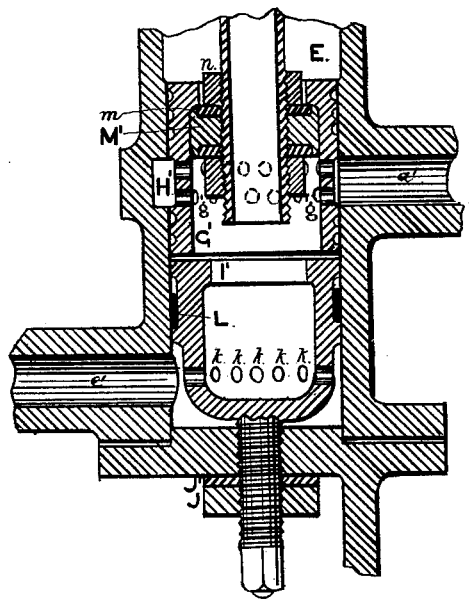

Figure 1 shows a general section through the meter; Fig. 2, a plan thereof, with the guide for the top of the valve-spindle removed; and Figs. 3 and 4, sections through the side pipe and valves, drawn to a larger scale.

The same letters of reference apply to the same parts in all the figures.

First. A is the measuring-cylinder, with a branch upon it at each end $a\ a'$, to which is attached the side pipe, to be hereinafter described. The cylinder A is truly bored; or it may be lined with brass or other suitable material. Its bottom may be of one piece with it, as shown upon the drawings herewith, or it may be made loose and bolted on in the usual way. B is cylinder-cover, with a stuffing-box, $b$, on it, through which the piston-rod D works. The piston C is formed by two cupped leathers; or it may be of other suitable description. The piston-rod D is recessed from $d$ to $d'$, or may have other suitable provision, to form projections thereon for working the cam-lever, and by it the valves, as will be hereinafter described.

Second. The piston-valves for regulating the admission to and the expulsion of the water from the ends of the measuring-cylinder are two in number. They act in the double capacity of pistons and valves, as their peripheries are made to fit closely the interiors of the cylinders or chambers in which they work, and their faces to shut against collars at each end of such cylinders or chambers. As pistons, they prevent the escape of unmeasured water while being changed in position, and, as valves, are perfectly tight when shut.

The constructive details of the said piston-valves and their accessories are as follows:

E is the side pipe containing the valves. It has upon it two branches, $a\ a'$, for connecting it to the measuring-cylinder A, a third branch for joining it to the inlet-pipe $e$, and a fourth branch for attaching it to the outlet-pipe $e'$, and it has also a top cover, F, and a bottom cover, $f$. The chambers at each end of the side pipe, in which the piston-valves work, are formed by two bushes, the one fixed and the other movable, the latter being made movable for the purpose of easy adjustment, as the pistons, in shutting, act also as double-beat valves. G G' are the two fixed bushes. They are collar-bushes, truly bored to fit the piston-valves, and their collars faced for the latter to shut against.

In each of the fixed bushes G G' there is a port to communicate with the corresponding branch $a$ $a'$ on the side pipe which leads to the measuring-cylinder. These ports (instead of being the ordinary oblong openings generally in use) are formed by perforating the bushes G G' with a number of holes of small diameter, $g$ $g'$. Encompassing the ports thus formed are two annular chambers, H H', in the side pipe, and out of them are taken the branches $a$ $a'$ that lead to the measuring-cylinder. I I' are the two movable bushes. They form the collars or seatings against which the piston-valves shut when cutting off the communication between the measuring-cylinder A and the outlet-pipe $c'$. I is the top movable bush. Both it and the bottom movable bush I' are made adjustable from the outside of the meter when the pressure of the water is upon the valves. For this purpose the bush I is screwed into the top cover F of the side pipe, having flats upon it at $i$, by which it is turned when being adjusted. The bush I is fixed in position by a lock-nut, J, and made tight with a leather or india-rubber washer, J'.

In top movable bush I is formed the stuffing-box K, through which the valve-spindle works. The bottom movable bush I', for its adjustment, has a shank upon it, which is screwed into the bottom cover $f$ of the side pipe, and, like the upper bush I, first described, is fixed in position by a lock-nut, J, and made tight by a leather or india-rubber washer, J'.

To form a passage for the outlet-water through the bottom movable bush I', it is perforated with holes $k$ $k$, and made tight (above such holes) by the insertion of an india-rubber ring, L.

M M' are the two piston-valves. They are truly turned on their peripheries to fit the bushes G G', and, to render them perfectly tight when shut, have washers $m$ $m$, of leather or other suitable material, on both their faces. They are connected by a hollow rod or tube, N, through which the outlet-water from above the upper valves passes to the exit-pipe $c'$. The piston-valves M M' are secured upon the tube N by the nuts $n$ $n$ $n$ $n$, which nuts also serve to keep the leathers $m$ $m$ in their places. Instead of the tube N, a solid rod may be used if, for connecting the two ends of the side pipe for the passage of the outlet, a port be formed upon the side pipe, or a separate pipe be used for that purpose.

O is the valve-spindle, and P a cap for connecting it to the tube N, upon which the piston-valves M M' are fixed.

The cap P is perforated with holes $p$ $p$, as shown upon the drawings, to form an entrance for the outlet-water into the tube N; and, to permit freedom of movement, a little play is given between the valve-spindle O and the cap P.

Q is a guide for the top end of the valve-spindle O. It is carried from the standard for the gearing, to be hereinafter described.

Third. The valve-gearing, or mechanism for changing the positions of the valves at the end of each stroke, consists as follows:

($a$.) A lever, R, hereinafter called the "cam-lever," which is raised and depressed by the projections $d$ $d'$, created by recesses or otherwise upon the piston-rod D. This lever is of the bell-crank form, having formed upon it, at right angles to the arm which the piston-rod works, a heart-shaped cam, $r$. On the upper part of the heart plate or cam $r$, and at right angles to the plane of its face, are two projecting studs, $r'$ $r'$, fitted with rollers, which are below, and their centers parallel to the center line of the lever when seen in side view, as in Fig. 1 in the drawings.

($b$.) A lever, S, hereinafter called the "weight-lever," one end of which carries a roller, $S^1$, that bears against the heart-shaped cam $r$, and the other end a weight, $S^2$, which weight, as will be hereinafter described, changes the position of the piston-valves M M'. The center of the weight-lever S is fixed below that of the cam-lever R, and on one side of it. A spring or other mechanical equivalent may be substituted for the weight; or it may be effected by hydraulic pressure through the medium of a ram and cylinder; but I prefer a weight.

($c$.) A double-ended lever, T, hereinafter called the "valve-lever," which works loose on the same fixed center as the cam-lever R, and the ends of which are raised alternately by the projecting studs $r'$ $r'$ on the cam $r$, those studs being below it. One end of this lever T is connected to the valve-spindle O, and the other end carries a weight, T', to counterbalance that of the two piston-valves M M' in the side pipe E.

($d$.) A standard, U, which is fixed upon the side-pipe cover, for carrying the above-named lever and the guide for the top of the valve-spindle.

Fourth. The clock-work, by which the quantity of water measured is registered, is actuated by the piston-rod D, and is so arranged as to take its indications from the space traveled by the piston C, not from the number of its strokes; but as there is nothing new in this, and consequently no claim founded by me upon or in connection with it, I have not considered it necessary to show it upon the drawings beyond merely marking the position of the dials.

V is a casing for inclosing the upper works of the meter and the registering apparatus, and $v$ a small casing formed upon the bottom cover of the side pipe, to prevent improper interference with the screw on the bottom movable bush I', both of which are sealed or locked up in the usual way.

The mode of working is as follows: The piston C being at the top end of the measuring-cylinder A, and the two piston-valves M M' also at the highest point of their stroke in the side pipe E, with their faces against their respective upper seatings, as seen in Fig. 1 in the drawings, the top end of the cylinder A (above the piston C) will be open to the inlet-pipe e, and the bottom end of the said cylinder (below the piston C) will similarly be open to the outlet-pipe e'. The inflowing water will then enter the top end of the cylinder (above the piston) and force the latter downward. In its descent the piston-rod will, by its upper projection d coming in contact with the cam-lever R, depress the latter, and the cam r will, of course, at the same time depress the roller $S^1$ on the weighted lever, and thereby raise the weight $S^2$ at its other end; but as soon as the point of the heart or cam r has passed the center of the roller $S^1$ the weight $S^2$ will descend, causing the said roller to run up the other curved side of the cam r, and thereby completing the stroke of the cam-lever R. Or, more briefly, the motion of the cam-lever R until the point of the cam r has passed the center of the roller $S^1$ is effected by the piston-rod D and the remainder by the weight-lever S; and as the projecting studs r' r' on the cam r are so arranged as to come in contact with the valve-lever T just as the point of the heart-plate r is directly over the roller S, the piston C, in carrying such point over the dead-center, will at the same time release the piston-valves M M', which had previously been stationary, from their seatings, to which they are held by the pressure of the water caused by their differential areas when shut; and the said piston-valves being perfectly *in equilibrio* and all but frictionless, the changing of their positions will be easily, surely, and instantaneously effected by the descent of the weight $S^2$.

It will also be apparent that, as the piston-valves M M' are made to cover at once both ports formed by the holes g g', in passing them one port will not nor cannot be opened until the other port is closed, thereby preventing the escape of any unmeasured and unregistered water, technically termed "slip" or "flow," in the changing the position of the said piston-valves, the meter thus becoming a dead block to the passage of the water unless the main piston C moves, and with it also, of course, the registering apparatus.

The downstroke of the piston is effected in like manner to the upstroke, and a quantity of water corresponding with the contents of a cylinder generated by the area of the piston and the distance which it has traveled having been thus measured and registered by an up-and-down stroke of the piston C, it is ready to reascend.

I claim as my invention—

1. In a fluid-meter, the piston-valves M M', whether in the form shown or with cup-leathers, or with any other suitable form of packing, but made to fit closely the cylinders or valve-chambers G G', in which they work, and to cover at the same time both the ports that lead from the measuring-chamber, so that one cannot be opened until the other be closed, thus preventing slip.

2. The combination, in fluid-meter valves, of piston-valve M M' with the movable bush I I' and fixed bush G G', so that the piston-valve M M' shall not merely act as a valve on the periphery by covering the ports G or G', but also on its upper and lower side by bearing alternately against the flanges of I or I' or of G or G'.

3. The combination of the weighted lever T, the lever R, having the heart-plate arm r and the projecting studs r' r', with the slot d d' on the main piston-rod, or their mechanical equivalents, for the purposes described.

4. The combination of the lever S, having the weight $S^2$ and the roller $S^1$, with the bell-crank lever R r, actuated by the piston-rod D, or their mechanical equivalents, substantially as described.

THOMAS MELLING.

Witnesses:
WM. P. THOMPSON,
E. GARDNER COLTON.